Inventor
John Edward Cope
By Emery, Holcombe & Blair
Attorneys

Aug. 18, 1953

J. E. COPE 2,649,501

TELEVISION TRANSMITTING APPARATUS

Filed Nov. 23, 1949

2 Sheets-Sheet 2

Inventor
John Edward Cope
By Emery, Holcombe & Blair
Attorneys

Patented Aug. 18, 1953

2,649,501

UNITED STATES PATENT OFFICE 2,649,501

TELEVISION TRANSMITTING APPARATUS

John E. Cope, Cambridge, England, assignor to Pye Limited, Cambridge, England, a British company Application November 23, 1949, Serial No. 129,009
In Great Britain November 24, 1948

5 Claims. (Cl. 178—7.2)

The pick-up tube of a television camera, such as an iconoscope or image-iconoscope, has its output electrode connected to a load resistance, the voltage variations across which are fed to an amplifier, generally a pre-amplifier incorporated in the camera, which in turn feeds a main amplifier. This load resistance must have a high value, for example of the order of 1 to 2 megohms, so that a high signal-to-noise ratio can be obtained. Since this load resistance is shunted by a capacitance constituted by the capacity of the backing plate of the mosaic or target surface of the pick-up tube to ground, wiring capacitance to ground, and amplifier input capacitance, this input circuit to the amplifier integrates the signal received from the pick-up tube and compensating networks have consequently to be provided in the subsequent amplifier channel in order that the output signal from the main amplifier may have a substantially uniform frequency response characteristic. This compensating network normally comprises a differentiating circuit in the main amplifier. Unless this frequency compensation is correctly carried out, the well-known "streaking" effect is produced on the reproduced picture.

In practice it has been found that the compensating network requires repeated adjustment in order to obtain a substantially uniform response over the range of frequencies involved, and when televising moving scenes with widely changing light levels it has proved impractical for the operator to keep the manual compensation control accurately adjusted to prevent "streaking."

I have now discovered that the reason why the characteristics of the compensating network appear to go out of adjustment quickly is due to the fact that the output impedance of the pick-up tube depends upon the average illumination of the tube and a component depending on the value of the scanning beam current. For example, in the case of a pick-up tube of the image-iconoscope type in which the scene to be televised illuminates a photo-cathode which releases electrons which bombard corresponding points of a mosaic or target surface which is also bombarded with the scanning electron beam, it has been found that the tube has a variable impedance component varying between 4 and 20 megohms depending upon the average photo-cathode illumination, and a component depending upon the value of the scanning beam current, this component being approximately 8 megohms for normal operation. This variation in ohmic tube impedance which exists across the load resistor changes the time constant or frequency response characteristic of the amplifier input circuit and makes it necessary to effect corresponding re-adjustment of the compensating network in the amplifier if "streaking" is to be avoided.

The present invention has for its object to provide a television camera or transmitting apparatus which overcomes these difficulties and which automatically compensates, or substantially compensates, for variations in the impedance of the pick-up tube which occur during the transmission of a television programme by reason of the fact that the average illumination of the pick-up tube changes with changing scenes or even during the transmission of the same scene.

To this end, the present invention consists in a television camera or transmitting apparatus comprising a pick-up tube having its output electrode connected to a load resistor, the voltage variations across which are fed to an amplifier, and wherein means are provided for automatically compensating, or substantially compensating, for variations in the frequency response characteristic of the circuit in dependence upon the variations of the impedance of the pick-up tube.

This result is achieved according to a feature of the invention by employing negative feedback in the amplifier with such a high feedback ratio that variations in the impedance of the pick-up tube produce negligible change in the time constant of the amplifier input circuit. The negative feedback arrangement must avoid self-oscillation at low frequencies, and to this end, according to another feature of the invention, a multi-stage amplifier is employed of which the time constants of all the stages, except one, are large so that no phase shift takes place before about 20 cycles per second, the said excepted stage having a time constant which produces linear decay with falling frequency.

The frequency compensation can be effected in the feedback amplifier over the entire frequency range if the amplifier produces a sufficiently high feedback ratio. Alternatively, since the variations in the impedance of the pick-up tube at different light levels mainly affect the frequency response characteristic at lower frequencies and has substantially negligible effect at higher frequencies, the automatic compensation by feedback may only be effective at the lower frequencies, which necessitates only a smaller feedback ratio with consequential simplification of the feedback amplifier, the higher frequencies being compensated in a subsequent stage of the amplification channel, for example in the main amplifier, in the conventional manner.

In order that the invention may be more clearly understood, reference will now be made to the accompanying drawings, in which.

Figure 1:
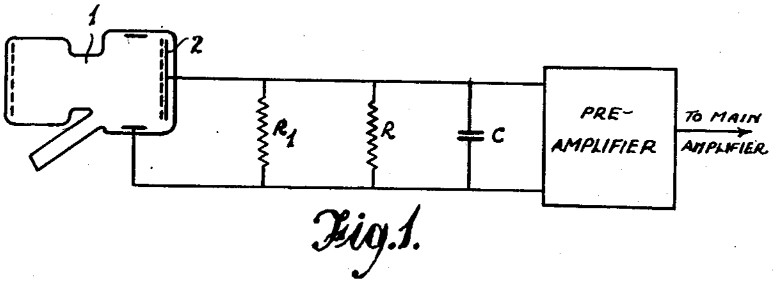
Figure 1 shows the effective resistances and capacities of a conventional circuit coupling the pick-up tube output and amplifier input.

Referring to Figure 1, the pick-up tube 1, shown as of the image-iconoscope type, has its signal plate output electrode 2 connected to the pre-amplifier 3 by a circuit comprising a load resistance R, which may be of the order of 1 to 2 megohms. The variable ohmic impedance of the pick-up tube may be indicated by the resistance R1 shunted across the load resistance R. Also shunted across the resistance R is the capacitance C which is the sum of the capacities of the pick-up tube, wiring and amplifier input capacities, all in shunt. Whilst Figure 1 may not be complete in every particular, it shows the effective resistances and capacities in the circuit coupling the pick-up tube and pre-amplifier in a sufficiently complete manner for the purpose of understanding this invention.

Experiments have shown that the value of R1 depends upon the average illumination of the pick-up tube, the influence of the scanning beam, and the influence of ion and electron currents caused by residual gases in the pick-up tube envelope. These variations in R1 will influence the time constant of the input circuit to the pre-amplifier, particularly at low frequencies, thus making it essential continuously to effect the adjustment of the compensating network in the subsequent main amplifier if "streaking" is to be avoided. It has proved impractical for the operator manually to adjust the compensation control in order to effect the necessary compensation at the varying light levels, and the present invention provides means for automatically effecting this compensation.

This automatic compensation is achieved, in the arrangement to be described, by means of a feedback circuit to the signal plate which, with appropriate value of the feedback ratio, provides effective compensation for any change of the tube resistance R1 over a wide range.

Figure 2:
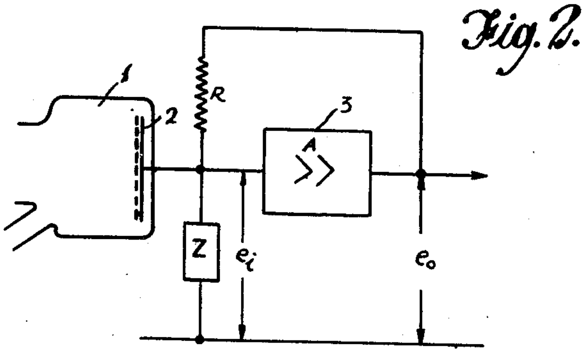
Figures 2 and 3 are diagrams for explaining the operation of the invention.

The principle of this feedback arrangement is illustrated in Figure 2. The signal plate 2 is connected to the input of the pre-amplifier 3 having a voltage gain A, the amplifier output voltage $e_0$ being arranged to be in anti-phase to the input voltage $e_i$, for example by constructing the amplifier 3 with an odd number of stages. The load resistance R is connected to the amplifier output and causes a strong voltage feedback. At the amplifier input is the impedance Z constituted by the ohmic impedance R1 of the pick-up tube in shunt with the input capacitance C.

The feedback amplifier has a voltage amplification ratio of:

$$\frac{e_0}{e_i}=\frac{1}{\frac{1}{A}+\frac{Z}{Z+R}}$$

The pick-up tube generates current pulses $i$ which represent the television signal. The signal voltage $e_i$ equals this current $i$ multiplied by the total output impedance of the signal circuit, that is:

$$e_i=i\cdot\frac{R.Z}{R+Z}$$

It is assumed that the source impedance is sufficiently high so that the effect of the signal circuit on the current $i$ can be neglected. Experimental evidence has confirmed this assumption. The output voltage is then given by:

$$e_0=i\cdot\frac{R.Z}{R+Z}\cdot\frac{1}{\frac{1}{A}+\frac{Z}{Z+R}}=iR\frac{A}{\frac{R}{Z}+1+A} \quad (1)$$

In Equation 1 it is assumed that the amplifier output impedance is small compared with R. It is apparent from Equation 1 that if 1+A is large compared with $$\frac{R}{Z}$$

then $e_0$ will be independent of the impedance Z. Therefore by a suitable choice of the amplification term A, any desired degree of immunity from changes of output voltage with changes of impedance Z can be obtained.

Figure 3:
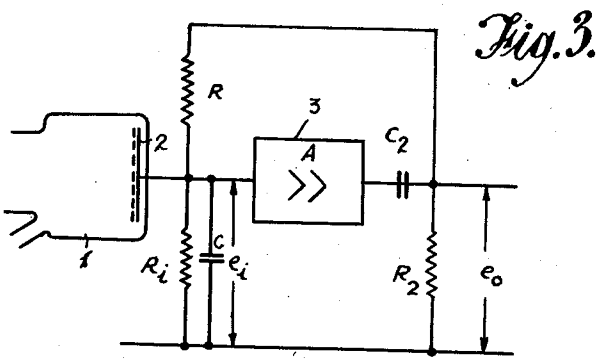

Figure 3 shows a more detailed arrangement of Figure 2 in which the impedance Z is replaced by the resistance R1 and capacity C. C2 is a coupling condenser in the output circuit of the amplifier 3, and R2 is a resistance connecting the load resistance R to earth. In this case we have to write for Z:

$$Z=\frac{R}{1+pRC}$$

where $p=j\omega$. Equation 1 then becomes:

$$e_0=i.a\frac{1}{1+p\frac{RC}{1+A+\frac{R}{R1}}} \quad (2)$$

in which $$a=\frac{AR}{1+A+\frac{R}{R1}}$$

This result gives an idea of the mode of operation of the feedback compensation principle. It will be apparent that the frequency response of the signal is no longer determined by the time constant T given by the equation $$T=\frac{RR1}{R+R1}\cdot C$$

but by the smaller time constant T′ given by the equation $$T'=\frac{RC}{1+A+\frac{R}{R1}}\approx\frac{RC}{1+A} \quad (3)$$

in which R1 is of much lower influence. This can also be explained as follows. In a system with high feedback, the amplification is mainly given only by the feedback ratio. This ratio, in the present case, is the potential divider ratio.

$$\frac{R}{R1}(1+pR_1C)$$

The time constant of the input circuit influences this ratio and the signal amplitude in such a manner that these two effects nearly compensate each other.

However, owing to the fact that the feedback decreases with increasing frequency, this compensation is not effective for an unlimited frequency range. For practical values of A, the time constant T' will not be negligible and some subsequent compensation at the upper end of the frequency range may be necessary. However, in this upper frequency range the reactance of the capacitance C is numerically much smaller than R1 and therefore changes in R1 are of no importance.

The following estimation will show the values for A which are sufficient to obtain the required compensation. Assuming that the load resistance R is 2 megohms and that the tube resistance R1 changes from infinity down to about 4 megohms under normal conditions, the maximum value for $$\frac{R}{R1}$$

will be 0.5. It therefore follows from Equations 2 and 3 that if A equals 50, then R1 may double its value with only one half of one percent change in $e_o$. Experiments have confirmed that with A having a value of 50 all "streaking" effects resulting from variations in R1 were effectively compensated.

The compensation of "streaking" effects by the use of feedback to the signal plate is particularly advantageous because not only are resistance changes of the pick-up tube due to average illumination compensated, but also changes due to any other reason, such as a change of beam current and other second order effects, will be compensated at the same time. This compensation is further automatically achieved without it being necessary to know the impedance function of the various parameters.

The loss of amplification in the pre-amplifier involved by the introduction of feedback does not result in a net loss of amplification throughout the entire amplification channel because the application of feedback also effects the necessary differentiation of the signal in order to compensate for the integration which takes place in the amplifier input circuit. Thus the loss of amplification previously occurring in the main amplifier due to the compensation network normally provided is saved, and the advantages of the present invention are achieved without it being necessary to provide additional amplification in the amplification channel as a whole.

If complete compensation is to be achieved in the pre-amplifier, this must have a high voltage gain, for example of approximately 1200. Such high values of amplification in the feedback loop are inconvenient because of difficulties with instability outside the normal frequency range. Because feedback depends on the frequency, these difficulties may be considerably reduced in the lower frequency range by decreasing the amplification A to a lower value, for example to a minimum of about 50, in order fully to effect the "streaking" compensation for variations of R1 whilst effecting compensation for the higher frequencies by means of a manually adjusted compensating network in the main amplifier.

The decision as to which methods of frequency response compensation should be adopted depends on several practical points of view. The complete compensation in the pre-amplifier has the advantage that the signal leaves the camera fully corrected and there is no need for re-adjustment if the pick-up tube is changed, because the feedback is sufficient to eliminate all tolerances. On the other hand, the high value of amplification required with this arrangement has the disadvantage that the amplifier becomes more complicated, and the mechanical position of the feedback resistor becomes critical to avoid the effect of stray capacities. These difficulties are reduced by the use of the second method, because in this case the feedback is ineffective in the range of high frequencies. Also the pre-amplifier is simpler and smaller, so that the second method is more suitable in the case of space limitation in the camera. A disadvantage of the second method is the necessary adjustment of the compensating network in the following main amplifier.

Figure 4:
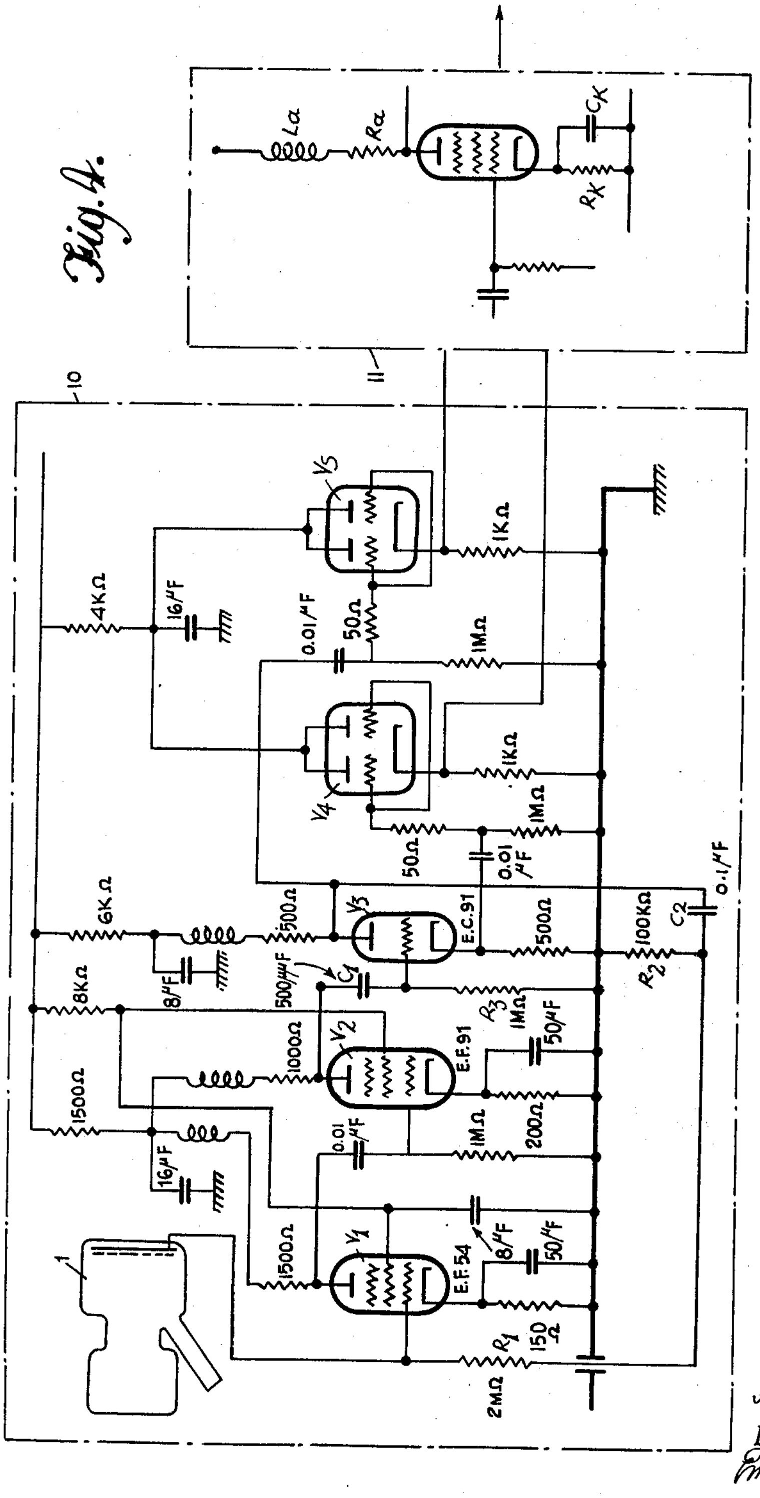
Figure 4 shows a circuit arrangement of an amplifier chain for achieving the results of this invention.

Figure 4 shows a circuit arrangement of the camera chain of a television transmitting apparatus embodying the second method above described. The camera, indicated by the rectangle 10, contains the pick-up tube 1 and a preamplifier consisting of a three-stage feedback amplifier comprising the valves V1, V2, V3 followed by two balanced output valves V4, V5 feeding the main amplifier which is indicated by the rectangle 11. The feedback amplifier comprises three resistance-coupled stages, the negative feedback path running from the anode of V3 via the load resistance R1 connected to the signal plate of the pick-up tube. The resistance R1 is connected to "earth" through the resistance R2.

No difficulties are experienced in the high frequency region because of the linear decrease of feedback with frequency, the feedback of the pre-amplifier being ineffective in the range of high frequencies where appreciable phase distortion may occur. Special care must be taken in the low frequency range, however, in order to avoid re-generation. The decrease of amplification with decreasing frequency must be such that the absolute value of A is smaller than unity when phase distortion is present. This is achieved by the insertion of a small time constant circuit, comprising the condenser C1 and resistance R3, between the anode of the second valve V2 and the grid of the third valve V3, whilst the time constants of all the other circuits are large, being greater than the time constant of C1 R3 by, for example, some 20 times. With this arrangement no phase deviation exceeding 90° can take place so that oscillating at low frequencies is avoided.

The compensation for the higher frequencies is effected in the main amplifier 11 for example by the time constant circuits $R_kC_k$ and $L_aR_a$ in the circuit of one of the valves V6 in the main amplifier.

Whilst particular embodiments have been described, it will be understood that various modifications may be made without departing from the spirit of the invention. Thus, for example, instead of compensating for variations of R1 by means of a feedback circuit, the automatic control may be achieved by automatically adjusting the time constant of the compensating network in the main amplifier in dependence upon the average illumination of the pick-up tube. This may be achieved by adjusting the time constant of the compensating network by a control potential derived, for example, from a photocell subjected to the same average light level as the pick-up tube, or direct from the photo-electric current in the pick-up tube. This control potential may, for example, be applied as a biassing potential to a triode connected in the compensating network so that its impedance is adjusted by the variations of the control potential.

The words "compensates," "compensating" or the like when used herein and in the following claims are not to be read in the limited sense of complete compensation, but are intended to include substantial compensation whereby elimination of "streaking" is, in practice, effectively or substantially achieved.

I claim:

1. Television transmitting apparatus comprising a pick-up tube having its output electrode connected to a load resistor, means for feeding the voltage variations across said resistor to an amplifier, and means for applying the amplifier output to the output electrode of the pick-up tube as a negative feed-back voltage, said feedback amplifier comprising a multi-stage amplifier of which the time constants of all the stages, except one, are large so that no phase shift takes place before about 20 cycles per second, the said excepted stage having a time constant which produces linear decay with falling frequency.

2. Apparatus as claimed in claim 1, wherein the feed-back ratio is of such value that variation of the time constant of the amplifier input circuit resulting from variations of the impedance of the pick-up tube is compensated and a compensating network in a subsequent amplification stage for compensating the frequency response at higher frequencies.

3. A television camera comprising a pick-up tube having its output electrode connected to a load resistor, a multi-stage pre-amplifier to which the voltage variations across said resistor are fed, and a negative feed-back connection from the output of the amplifier to the output electrode of the pick-up tube, said load resistor being connected in said feed-back circuit.

4. Television transmitting apparatus comprising a television camera incorporating a pick-up tube and a multi-stage pre-amplifier, means connecting the output electrode of the pick-up tube to the input of said pre-amplifier, a negative feed-back connection between the output of said pre-amplifier and the output electrode of said pick-up tube, a load resistor connected in series in said feed-back connection, a main amplifier, a frequency compensating network in said main amplifier, and means for feeding the output from said pre-amplifier to the input of said main amplifier.

5. Television transmitting apparatus comprising a television camera incorporating a pick-up tube and a multi-stage pre-amplifier, means connecting the output electrode of the pick-up tube to the input of said pre-amplifier, a negative feed-back connection between the output of said pre-amplifier and the output electrode of said pick-up tube, a load resistor connected in series in said feed-back connection, a resistance connecting the end of said load resistance remote from the output electrode to earth, a main amplifier, a frequency compensating network in said main amplifier, and means for feeding the output from said pre-amplifier to the input of said main amplifier.

JOHN E. COPE.

References Cited in the file of this patent

UNITED STATES PATENTS

| Number | Name | Date |
|---|---|---|
| 2,247,511 | Lewis | July 1, 1941 |
| 2,292,919 | Barco | Aug. 11, 1942 |
| 2,337,234 | Eaton | Dec. 21, 1945 |

FOREIGN PATENTS

| Number | Country | Date |
|---|---|---|
| 857,437 | France | Sept. 12, 1940 |